Patented Jan. 22, 1952

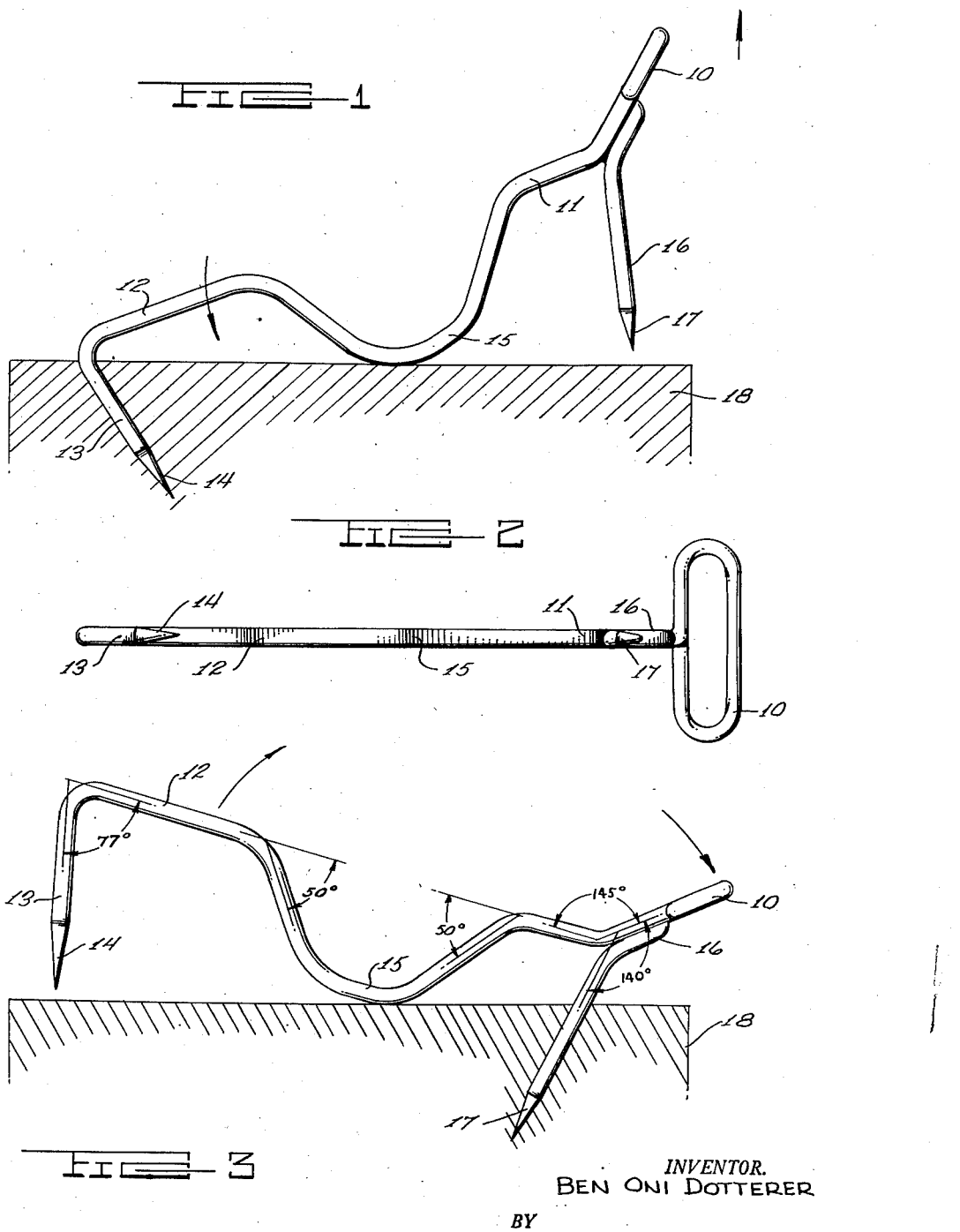

2,583,091

UNITED STATES PATENT OFFICE 2,583,091

BALING HOOK

Ben Oni Dotterer, Mansfield, Ohio

Application February 10, 1950, Serial No. 143,569

6 Claims. (Cl. 294—26)

This invention relates to implements for the handling of packages and the like and more particularly to those commonly termed baling hooks.

In previous forms of baling hooks the structure employed was of such a nature as to firmly attach itself to a bale of hay or whatever the handled material was that when hooked therein needed considerable effort to remove it, after it had completed its use. This made the work more difficult than desirable and frequently involved unnecessary damage to the bale. In this invention a device is provided that will do the work effectively. It is hooked into the bale in the conventional manner and when desired is easily detached by using pressure on its handle in a convenient and non-slipping manner.

It is therefore an object of this invention to provide a novel and improved baling hook that will avoid one or more of the disadvantages and limitations of the previous art.

Another object of the invention is to provide a new and improved baling hook that can be attached and removed readily, in its use on packages.

A further object of this invention is to provide a new and improved baling hook that will be simple in structure, effective in operation and economical to produce.

Other objects will become apparent as the invention is more fully described.

For a better understanding of the invention, its objects, principles and operation, reference is made to the accompanying drawings. These drawings in conjunction with the following specification outline a particular form of the invention by way of example, while the claims emphasize the scope of the invention.

In the drawings:

Figure 1 is a side elevation of a baling hook embodying this invention, and shown applied to a bale of material.

Figure 2 is an underview of Figure 1; and,

Figure 3 is a side elevation of the baling hook, as in Figure 1 in a position for its removal.

Similar reference numerals refer to the same parts throughout the drawings.

In the particular structure illustrated in the drawings, a baling hook consists of an elliptical or looped handle 10, from the central underside portion of which extends a shank at about 145° thereto having end sections 11 and 12 respectively adjacent the handle and the bill 13, with a converging U-section 15 in between. The U-section 15 is arbitrarily termed the hump. The section 11 is about half the length of the section 12. The bill 13 is formed or bent from the section 12 at an angle of 77° and is made just a little longer than the depth of the hump which it is aligned with. The bill 13 has a sharpened point 14 suitable for piercing the bale or other article easily, but not injuriously. The handle 10 is so formed that a stud 16 is extended from it under the shank section 11 and bent downwardly at an angle of about 140° thereto, and terminated in a sharpened point 17. It is the same length practically as that of the bill 13. Its direction is downwardly or in the same general direction as that of the bill 13 except that they are converged slightly toward each other instead of being parallel. The baling hook is used by grasping the looped handle 10 with one hand and bringing the point 14 to the surface of the bale 18 at an angle, so that a pull or tug on the handle will force the bill 13 into the bale. This last position is shown in Figure 1. The hump 15 rests against the bale and the stud 16 is above it but close. A pressure on the broad or flat side of the handle will give the hook a rolling rotative movement with the hump 15 as the fulcrum or rest, and remove the bill 13 from the bale. At the same time the stud will enter the bale and keep the hook straight, and will prevent the hook from slipping. Then when the movement is sufficient and the bill 13 is lifted out of the bale, the stud is removed also by pulling upwardly on the handle 10. The amount of rotative movement of the hook is restricted by the position of the handle. The general design preferred is indicated in the drawings, especially in Figure 3 where a preferable angular alignment is marked thereon. The handle 10 is 145° displaced from the shank 11. The sides of the hump are positioned 50° below the shank axis, and the stud is 140° from the plane of the handle. These values have been found to suit baling work. The baling hook can be hung up by the handle, and the joints under the bill and space between the stud and section 11. Also the stud may be driven in a wall like a nail if a hanging position is to be assumed that will prevent the points 14 and 17 from being exposed. The device by reason of the hump 15 can be readily rocked and being of a rolling action gives a longer and more gradual action to its detaching operation. The hump having plenty of surface to ride on has no tendency to dent in the bale it is used on. The hook may be made from a single piece of material, preferably of rod, and therefore offers considerable economy in its manufacture.

While but one form of the invention has been illustrated and described herein, it is not desired to limit its structure to such form, as it is appreciated that other forms could be developed that would employ the same principles and come within the scope of the appended claims.

Having thus described the invention, what I claim is:

1. A baling hook comprising a shank including a sharpened bill formed as an angular extension of the shank and a hump arranged for rocking contact with a package to be hooked by the bill, said bill traveling in the direction of its own length to hook the package on rocking of the hump upon the package, a handle on the shank adapted to manipulate the shank and move therewith in a direction substantially parallel but opposite to the direction of travel of said bill when hooking said package, and a stud projected from said shank on the underside thereof and in a direction parallel to the direction of movement of the handle, said stud being spaced away from said bill and out of contact with said package when the bill is hooked as aforesaid and contacting said package when the bill is raised out of said package by the rocking of said hump.

2. A baling hook comprising a handle, a shank extending from the handle at an angle thereto and including a hump between two end sections all in the same plane, a bill extending from the shank at the end of one of said sections spaced from said handle and angularly disposed from said last mentioned section to form a hook substantially therewith for hooking into a package, the depth of said hump being substantially equal to the length of said bill and enabling the shank to be given a rolling rotative movement thereon during hooking and unhooking of the bill, and means on the shank for controlling the end motion of the bill during its unhooking travel from the package.

3. A baling hook comprising a handle, a shank extending from the handle at an angle thereto and including a hump between two end sections all in the same plane, a bill extending from the shank at the end of one of said sections spaced from said handle and angularly disposed from said last mentioned section to form a hook substantially therewith for hooking into a package, the depth of said hump being substantially equal to the length of said bill and enabling the shank to be given a rolling rotative movement thereon during hooking and unhooking of the bill, and means on the shank for controlling the end motion of the bill during its unhooking travel from the package, said means including a stud with a sharpened point end connected with the handle and at an angle coordinated with the angle of the bill whereby it will pierce the package upon travel in a direction opposite to that in which the bill travels during the rotative operation of said shank tending to unhook the bill.

4. A baling hook comprising a single piece of material formed to include a shank having a straight section at one end thereof, a looped handle integral with and disposed angularly to said section, a sharpened stud rigid with the handle and disposed angularly relative thereto and to said section, the remaining length of the shank being formed with a hump coplanar with and substantially the same length as the stud and with a second straight section parallel to the first mentioned section, a bill with a sharpened end extended from said second section in the same plane as the hump and on the same side of the shank as the hump and converging slightly toward the hump and substantially the same length as the depth of the hump, said bill being so arranged as to hook into a package when swung by the handle in the direction of the package and being positioned for removal when said hump is brought into contact with the package on the piercing of the package by said bill, said hump forming a rolling rotative fulcrum on the package on which to unhook said bill therefrom when the handle is actuated down toward the package, said stud being arranged to pierce the package as the bill is unhooked from the package and guide the hook through its travel so it will be steady against lateral movement during the unhooking, the stud being so positioned after piercing the package as to be readily removed by pulling upwardly on said handle.

5. A baling hook comprising a single piece of material formed to include a shank having a straight section at one end thereof, a looped handle integral with and disposed angularly to said section, a sharpened stud rigid with the handle and disposed angularly relative thereto and to said section, the remaining length of the shank being formed with a hump coplanar with and substantially the same length as the stud and with a second straight section parallel to the first mentioned section, a bill with a sharpened end extended from said second section in the same plane as the hump and on the same side of the shank as the hump and converging slightly toward the hump and substantially the same length as the depth of the hump, said bill being so arranged as to hook into a package when swung by the handle in the direction of the package and being positioned for removal when said hump is brought into contact with the package on the piercing of the package by said bill, said hump forming a rolling rotative fulcrum on the package on which to unhook said bill therefrom when the handle is actuated down toward the package, said stud being arranged to pierce the package as the bill is unhooked from the package and guide the hook through its travel so it will be steady against lateral movement during the unhooking, the stud being so positioned after piercing the package as to be readily removed by pulling upwardly on said handle, said stud being disposed at an angle approximately 140° in relation to the handle, and the handle to the sections at an angle of approximately 145°, the sides of the hump at 50° to the axes of the sections and the bill 77° with respect to the sections.

6. A baling hook including a handle, a shank projecting angularly from the handle and including an inner and outer coplanar section, a U-shaped fulcrum connecting the adjoining ends of the sections, a sharpened bill extending rearwardly from the outer terminal of the outer section in a similar direction to the fulcrum and a stud projecting from the handle at a substantially right angle from the inner shank section, said stud extending in a direction similar to the fulcrum and bill and being engageable in a package upon release of the bill by a rocking movement of the shank on the fulcrum, said stud being releasable by a straight upward pull on the handle.

BEN ONI DOTTERER.

REFERENCES CITED

The following references are of record in the file of this patent:

UNITED STATES PATENTS

| Number | Name | Date |
| --- | --- | --- |
| 1,710,575 | Grant | Apr. 23, 1929 |
| 1,757,610 | Bergdal | May 6, 1930 |